United States Patent [19]

Frank

[11] 4,025,678

[45] May 24, 1977

[54] FLOCKED EXPANDED-PLASTIC FABRIC AND METHOD

[75] Inventor: Robert J. Frank, Norwich, Conn.

[73] Assignee: Pervel Industries, Inc., Plainfield, Conn.

[22] Filed: July 9, 1976

[21] Appl. No.: 704,092

[52] U.S. Cl. .................................. 428/90; 156/78; 156/83; 156/156; 156/248; 156/249; 156/254; 428/91; 428/151; 428/236; 428/245; 428/310; 428/315; 428/317; 428/904

[51] Int. Cl.² ..................... B32B 3/26; B32B 5/18; B32B 33/00

[58] Field of Search .............. 428/90, 91, 151, 236, 428/245, 310, 315, 317, 904; 156/78, 83, 153, 248, 249, 254

[56] References Cited

UNITED STATES PATENTS

| | | | |
|---|---|---|---|
| 3,284,274 | 11/1966 | Hulslander | 428/904 |
| 3,607,493 | 9/1971 | Anderson | 156/153 |
| 3,914,492 | 10/1975 | Wisotzky | 428/151 |
| 3,939,021 | 2/1976 | Nishibayashi | 428/904 |

*Primary Examiner*—Marion E. McCamish
*Attorney, Agent, or Firm*—Hopgood, Calimafde, Kalil, Blaustein & Lieberman

[57] ABSTRACT

The invention contemplates expanded-plastic coated fabric wherein the exposed surface of the expanded plastic is characterized by a random distribution of torn cellular pockets and by a random distribution of projecting free ends of flock elements which are rooted to the plastic at their other ends. Various methods of making the fabric are described, with different "hand" or "feel" depending upon the method and upon the materials and their dimensions.

25 Claims, 6 Drawing Figures

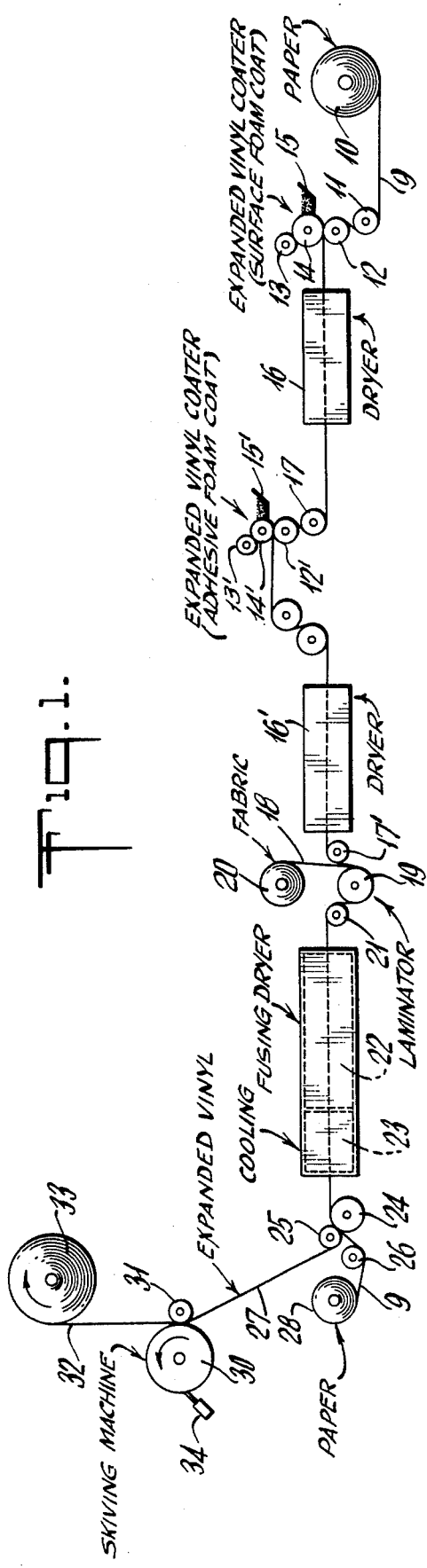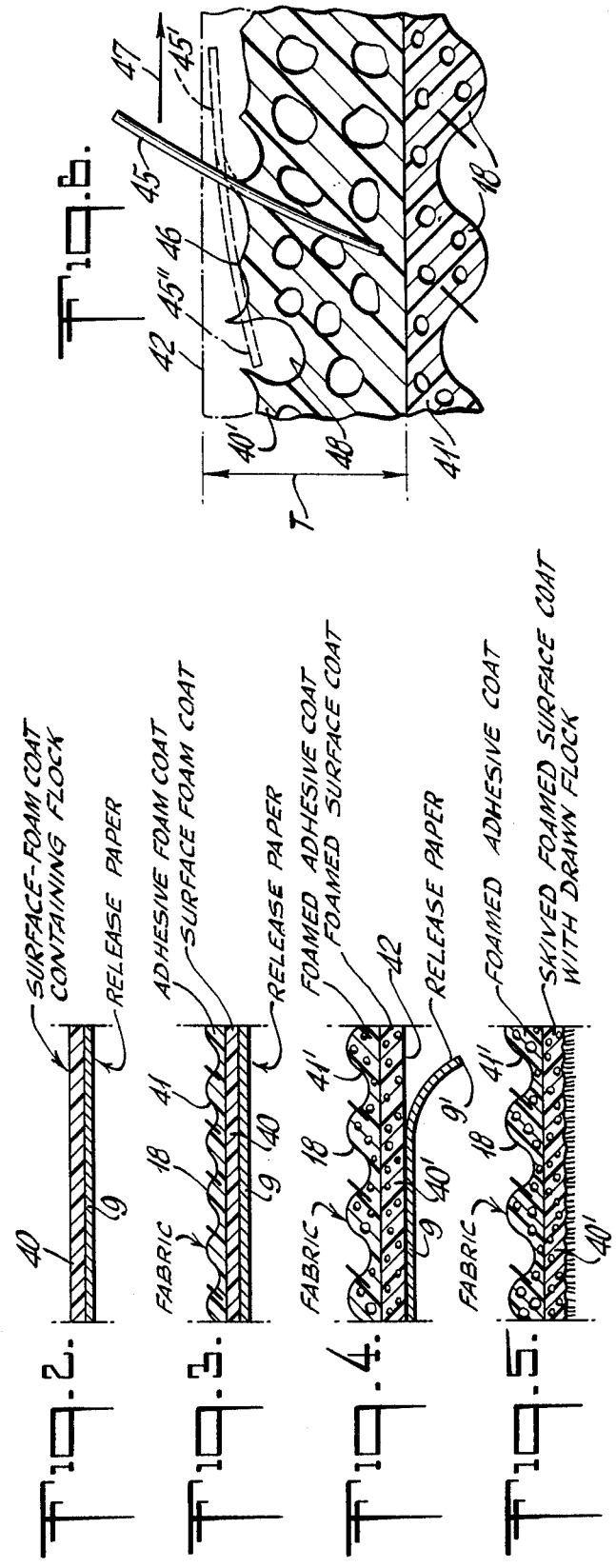

FLOCKED EXPANDED-PLASTIC FABRIC AND METHOD

This invention relates to expanded-plastic fabrics and in particular to those having an exposed surface with the appearance and "feel" of split leather.

Expanded-plastic coatings on fabric have been caused to produce a suede-like appearance by removing the skin layer which is at the outer surface of the coating, thus exposing the granular pocked nature of the expanded region. Generally speaking, this exposed pocked surface has the appearance of uniformity, although close (microscopic) inspection will reveal random distribution of cellular pockets of the foamed region.

It is an object of the invention to provide an improved coated fabric of the character indicated wherein the appearance of the exposed surface of the coating has an inherently more "natural" character.

It is a specific object to provide such a fabric having the "hand" and dimensional appearance of split leather, for example, of split cowhide.

It is also an object to provide a random distortion to the foam structure of the expanded plastic in such fabrics, whereby the exposed surface has a three-dimensional appearance.

A further specific object is to achieve the above objects with a fabric wherein the appearance of split leather is further enhanced by the presence of flock elements in place of hair or bristle in natural leather.

Another object is to provide methods of making products of the character indicated.

Still another object is to provide methods which lend themselves to use in such coating of a wide range of fabrics, to serve a plurality of markets.

A general object is to achieve the foregoing objects with little or no added complexity of manufacture, and at substantially the same cost, as compared with production of existing products of the character indicated.

Other objects and various further features of novelty and invention will be pointed out or will occur to those skilled in the art from a reading of the following specification in conjunction with the accompanying drawings. In said drawings, which show, for illustrative purposes only, preferred article and method aspects of the invention:

FIG. 1 is a process flow diagram schematically illustrating steps in one method according to the invention;

FIGS. 2 to 5 are enlarged, fragmentary, sectional views illustrating various stages in the construction of an improved coated fabric of the invention; and FIG. 6 is a more greatly enlarged (and inverted), fragmentary, sectional view to show root support for one of the projecting flock elements in FIG. 5.

Briefly stated, more random distribution of cellular pockets in the foamed region of a plastic coating of the character indicated is achieved by use of flock, for example 1.1-Denier nylon flock, in the mix of foamable plastic, when applied to the casting surface. The flock roots itself in the plastic and projects beyond the outer surface of the plastic, to add a three-dimensional appearance, i.e., in addition to the more random appearance of the cell distribution. Together, these random effects, both attributable to the flock in the context of the expanded plastic, provide a "hand" and appearance that is unmatched by any other expanded-plastic coating of which I am aware.

Referring to FIG. 1 of the drawings, the invention is shown in application to a continuous process for the manufacture of fabric having an expanded-plastic coating with a cell-pocked surface from which flock elements project in random and generally upward orientation. The plastic with which the method has been used is a plastisol or organosol which may be or includes polyvinyl chloride as the significant component, so that the expanded plastic is expanded vinyl; however, the invention is not to be interpreted as so limited, in that other materials such as expanded urethane may also be used. The fabric is built on an initial base of casting paper 9, which may be a commercially available release paper, payed from a supply reel or drum 10 and over suitable guide rolls 11–12 for reception of a foamable surface coating of the basic plastisol or organosol which incorporates the expanding characteristics. In the form shown, a metering roll 13 and an application roll 14 deliver viscous liquid expandable plastic from a reservoir 15 to the top surface of the release paper 9, and the roll 12 may be a rubber pressure roll forming part of the coating unit. Thus coated, the paper is moved through a first drying oven 16. The temperature and duration of exposure within the drying oven 16 are such that, at guide roll 17, the cast plastic has become a gel, i.e., the coating on the release paper is tacky, and plastic-expansion has not proceeded to any appreciable extent. Importantly, and as will later be appreciated, the mix of plastisol or organosol which is applied at 14–15 includes a quantity of flock, for example, 1.1-Denier nylon flock, of length which is based upon coating thickness and desired appearance, and which generally constitutes 2 to 5 percent of the weight of the coating material. This flock is well-mixed and is therefore generally uniformly available over the full length of the coating mechanism 13–14–15.

The thus-coated paper may then be laminated to a reinforcing fabric 18, in the manner described in Anderson U.S. Pat. No. 3,607,493, but I prefer to cast an adhesive foam coat upon the gelled surface coat, prior to fabric lamination. Thus, in FIG. 1, a second expanded vinyl coater is shown, similar to the first coating means 13–14–15; similar parts therefore carry corresponding reference numbers, with primed notation. The adhesive foam coat introduced at 14'–15' may again be a plastisol or organosol which may be or includes polyvinyl chloride as the significant component. However, this coat is without flock admixture and has an expandable or "blow" capability less than the surface-foam coat with which the first casting operation is performed. For example, a 3.3x blow capability in the surface-coat material at 15, and a 2.2x blow capability in the adhesive-coat material at 15' will produce a satisfactory product. A second dryer oven 16' carries the adhesive coat to the gel stage, as described at 16 for the surface coat, and the tacky adhesive-gel surface is laminated to fabric 18 at roll 17', fabric 18 being shown continuously available from a supply roll 20.

The thus-laminated double-coated composite is then fed to a guide roll 21 for conduct into one or more higher-temperature ovens or fusing dryers 22, where the expandable vinyl materials are allowed to expand and to cure in expanded condition. In this part of the process and in the laminating process, the expandable adhesive plastic is caused to enter the voids or interstices of the reinforcing material 18 and to expand and cure in anchored relation thereto. The terminal phase of the dryer 22 is a cooling chamber 23 so that a guide roll 24 may thereupon be used in conjunction with subordinate guide rolls 25-26 to strip or separate the release paper 9 from the coated fabric, designated 27. A take-up reel 28 is shown receiving the release paper after stripping.

The stripped and coated fabric at 27 is characterized by a surface skin which follows the character of the release paper. In general, this will be smooth and slick and is therefore well-suited to heat-skiving at 29. A machine for heat-skiving is described in said U.S. Pat. No. 3,607,493, and it suffices here merely to explain that it includes a heated drum 30 in conjunction with a guide roll 31 to assure that the newly exposed skin surface will transiently encounter and thus adhere to the smooth outer surface of drum 30, while the remainder of the coated fabric (designated 32) is conducted to a take-up reel 33. Heat-skived skin material is cleaned off drum 30 at a doctor blade 34.

The build-up of fabric according to the invention will perhaps be better understood by reference to the simplified section diagrams of FIGS. 2 to 7. FIG. 2 depicts the situation in which the flock-admixed expandable vinyl surface coating 40 has been applied to the release paper 9 and has been gelled or made firm but tacky by action of the dryer 16. At this instant, the second or adhesive-foam coat 41 is applied to the coat 40. In turn, coat 41 becomes tacky by action of the dryer 16', whereupon the fabric 18 is applied to the tacky adhesive surface, under squeezing action at laminator 19, producing a section as illustrated in FIG. 3.

In the situation as depicted in FIG. 4, the action of the fusing dryer 22 has been such as to expand and cure the plastic surface coat 40 as indicated at 40', and to expand and cure the adhesive coat 41 as indicated at 41', the fabric 18 being embedded in the expanded adhesive layer 41', and thus raised away from its original proximity to the release paper 9. A peel at 9' suggests stripping the release paper from the composite at this point, so as to expose the thin skin 42 which is to be removed by skiving action.

In FIG. 5, the skiving action at 29 has peeled the skin 42 from the expanded plastic surface layer 40', thus exposing a surface which is characterized by randomly distributed pockings or open cellular pockets of the foam, as well as by randomly distributed flock elements, each rooted at one end in the foamed plastic and with an outwardly projecting other end. A typical flock element 45, and its rooted support in the foamed body 40' of the surface coating, are shown in FIG. 6, which also shows a fragment of the exposed pocked surface 46 of the foamed material 40' in addition to a phantom outline of the outer profile of skin 42 prior to skiving.

The precise mechanism by which the flock element 45 becomes generally upright and slightly tilted (with respect to a normal to the plane of skin 42) is not fully understood. However, the following explanation is offered in the expectation of increased understanding. It is first to be noted that flock length is initially selected to be at least of the order of magnitude of the blown thickness T of the surface coating 40'. That being the case, each flock element will necessarily be much more acutely inclined to the paper surface at initial casting than it is in the blown situation of FIG. 6. Generally, the doctor-blade technique depicted at 14-15 for initial casting is responsible for imparting a predominant directional orientation to most of the flock elements in the cast material, this direction being generally the direction of roll (14) rotation and therefore of web (paper) advance. Thus, where the heavy arrow 47 in FIG. 6 indicates the direction of web advance through the process of FIG. 1, the now freely projecting end of flock element 45 will understandably have initially been oriented close to the paper (as suggested at 45') and within the skin region 42 removed by skiving. The remainder 45'' of flock element 45 was not as close to the casting-surface plane 42 and therefore was more exposed to flexed displacement under the action of formed expansion within body 40', producing the much more erect rooted-end orientation shown in FIG. 6. Until skiving, the skin-embedded end 45' remained somewhat as originally cast, but the localized heat of skiving produced such a profile of heat across the thickness T as to be structurally weakening, essentially only at and near the skin region 42. Such weakening of cured plastic material manifests itself in local reduction in bonding effectiveness to the flock-element end 45' and in locally reduced tensile strength in that stratum of the foamed region which is immediately adjacent the skin 42. The situation is then in readiness for heat-skived separation of skin 42 from body 40', at the irregularly pocked surface 46. The action of peeling off skin 42 (on drum 30) erects the now-freed end of flock fiber 45 to the position shown in solid outline in FIG. 6, while certain of the voids in the foamed body are broken into outwardly open cavities with outwardly drawn edges, as suggested at 48 in the surface 46.

It is believed further to be the fact that in the course of expansion of body 40' each flock end (e.g. 45'') that is more removed from the casting plane of skin 42 provides a local stiffening action within the expanding body 40', and that the magnitude of such action reflects the net effect of several factors including viscosity of the expanding gel, and surface tension of the gel in its wetted contact with fiber 45 and at the walls of each developing gas pocket in the expanding gel. Whatever the explanation, it has been observed that a substantial fraction of the admixed flock fibers become elevated to a rooted and generally inclined projecting orientation, as to which fiber 45 in FIG. 6 may be considered illustrative. To have permitted such orientation, the fiber 45 must not have been initially applied throughout its length parallel to and adjacent the casting plane of skin 42. But the chances of such a parallel orientation are small, among the many randomly other possible sloping orientations; and for almost any degree of initial fiber slope (with respect to the casting plane), at least one end of the fiber will be more susceptible to the described elevation displacement in the course of the foamed expansion of body 40'. It is further observed, as to those few fibers that were cast sufficiently adjacent and parallel to the casting plane as not to be the subject of foam displacement, that they will be fully contained in the skin 42 and will therefore be removed upon skiving so as not in any way to adversely affect the texturing three-dimensional appearance effects attributable to projecting fiber ends.

It will be seen that the described method and article achieve all stated objects. For an expanded-vinyl product in which the surface casting 40 was approximately 0.010-inch thick, with an admixture of the indicated nylon flock cut to a 0.040-inch length, and with an approximately 3.5x blow, the heat-skived product has the three-dimensional look of a split leather such as cowhide; it thus provides an attractive shoe-upper material, for example. Moreover, the more random distribution of opened pockets (as at 48) and other irregularities in the exposed surface 46 are unique as to their irregular distribution, in comparison with any other skived expanded-vinyl product which has come to my attention. Further, the "hand" of the resulting product is more akin to the "hand" of split leather than is the case for other expanded-vinyl products I have known. The foregoing features additionally account for a more "natural" (i.e. natural-leather) look, in keeping with the stated observations as to the character of surface 46.

While the invention has been described in detail for the preferred embodiment and method, it will be understood that modifications may be made without departing from the invention. For example, as indicated above, foamable plastic materials other than vinyls may be used. And the fabric 18 need not be woven, since other fabric (e.g. braided, knitted, non-woven) may be utilized, depending upon the ultimate stretch or other requirement for use of the product. Neither is it necessary that the flock be of nylon or of any particular denier or length in that different appearance effects are achievable with different deniers, and interesting surface textures result from use of ⅛-inch or ¼-ingh length flock in place of the 0.040-inch length given in the above example.

Still further, it is to be understood that the invention is not necessarily to be deemed limited to use of release paper, or to heat-skiving of an expanded plastic from which release paper has been stripped, although what I have described in my present preference. For example, the schematic showing of drum 30 will be understood alternatively to designate a rotating abrasive drum whereby the skin 42 may be abraded to expose a surface 46 of abrasively torn expanded plastic, it being further understood that the skin-embedded flock end 45' is sufficiently strong to withstand the abrasive erosion by which skin 46 is removed.

Further by way of example, the casting paper 9 may be of the non-release variety, in which case the skin 42 will become firmly adhered to paper 9; in that event, the showing of roll 24 will be understood to schematically show a heated drum whereby paper 9 and skin 42 may be transiently heated (if necessary) to obtain the desired and described local weakening of skin 42 in its bond to ends of flock fibers (as at 45') and in the tension strength of its connection to the body 40' of foamed material. In the event of non-release paper 9, with skin stripping at 24–25–26, the skin 42 will be wound with used casting paper at 28; and the finished product will appear at 27 in condition for take-up storage at 33, by-passing the stage 29.

What is claimed is:

1. The method of continuously making an elongate fabric-reinforced flock-textured plastic-coated sheet, which comprises continuously applying a mix of liquid expandable plastic to a release sheet, and mix including a predetermined fraction of flock material that is bondable to the plastic, allowing the plastic to gel and to begin to expand and thus begin to orient a substantial fraction of the flock generally normal to the release sheet, continuously laminating a fabric to the plastic, allowing the plastic to complete its expansion, curing the fabric-laminated expanded plastic, stripping the release sheet from the plastic-coated fabric to expose a skin, and continuously removing said skin from said plastic-coated sheet to expose both the cellular pockets of the expanded plastic and the free upstanding ends of flock that were less securely bonded to said skin than to the remainder of said plastic-coated sheet.

2. The method of claim 1, in which said skin-removing step is by heat-skiving.

3. The method of claim 2, in which said heat-skiving step comprises transient application of heat essentially localized to said skin, whereby skin-localized adhesion to flock is locally weakened and whereby skin tear strength is also locally weakened at a relatively shallow depth into the expanded region, and tearing the skin from the flock and from the expanded plastic at said locally weakened regions.

4. The method of claim 1, in which said skin-removing step is by abrasion.

5. The method of claim 1, in which the laminating step comprises: casting a coat of liquid expandable adhesive plastic to said flock-admixed coat when the latter has at least partially gelled, applying the fabric to the adhesive-plastic coat, and allowing the adhesive-plastic coat to expand into adjacent interstices of the fabric prior to the curing thereof.

6. The method of claim 1, in which said fabric is a woven fabric.

7. The method of claim 1, in which said fabric is a knitted fabric.

8. The method of claim 1, in which said fabric is a non-woven fabric.

9. The method of claim 1, in which the flock is of length greater than the initially applied thickness of application to the release sheet.

10. The method of claim 1, in which the flock is of length which is in the order of magnitude of the expanded thickness of the expandable plastic.

11. The method of claim 1, in which the flock is of length which is at least substantially the expanded thickness of the expandable plastic, whereby upon skin removal a predominance of the exposed projecting ends of the flock will have been rooted in the expanded plastic at acute angles other than a strict normal to the exposed cellular surface of the expanded plastic.

12. The method of claim 11, in which the blown thickness of the expanded plastic is in the range of 0.035 to 0.050 inch, and in which the flock length is in the range 0.035 to 0.250 inch.

13. The method of claim 1, in which the expandable plastic mix is compounded for at least a 3x-blown expansion.

14. The product of the method of claim 1.

15. The method of claim 1, in which the percentage by weight of flock in said mix is in the range of two to five.

16. The method of claim 1, in which the flock is nylon.

17. The method of claim 1, in which the flock is of substantially one-denier synthetic filament.

18. The method of continuously making an elongate fabric-reinforced flock-textured plastic-coated sheet, which comprises continuously applying to a casting sheet a mix of liquid expandable plastic, said mix including a predetermined fraction of flock material that is bondable to the plastic, allowing the plastic to gel and to begin to expand and thus to begin to orient a substantial fraction of the flock generally normal to a skin region at the casting sheet, continuously laminating a fabric to the plastic, allowing the plastic to complete its expansion, curing the fabric-laminated expanded plastic, transiently applying heat essentially localized to the skin region of the plastic coat, whereby skin-localized adhesion to flock is locally weakened and whereby skin tear strength is also locally weakened at a relatively shallow depth into the adjacent expanded region, and tearing the skin from the flock and from the expanded plastic at said locally weakened regions.

19. The method of claim 18, in which said casting sheet is a release material which is stripped from the fabric-laminated expanded plastic after the curing step.

20. The method of claim 18, in which said casting sheet is a non-release material to which said skin adheres, said transient heat application being via and casting sheet, said tearing being the result of stripping the skin-adhered casting sheet from the remainder of the fabric-laminated expanded plastic.

21. The product of the method of claim 18.

22. The method of continuously making an elongate reinforced flock-textured plastic-coated sheet, which comprises continuously applying to a casting sheet a mix of liquid expandable plastic, said mix including a predetermined fraction of flock material that is bondable to the plastic, allowing the plastic to gel and to begin to expand and thus to begin to orient a substantial fraction of the flock generally normal to a skin region at the casting sheet, casting a second coat of a liquid plastic material to said flock-admixed coat when the latter has at least partially gelled, curing the second coat while curing the flock-admixed coat, whereby the second coat becomes a reinforcement for the expanded side of the flock-admixed coat, transiently applying heat essentially localized to the skin region of the flock-admixed coat, whereby skin-localized adhesion to flock is locally weakened and whereby skin tear strength is also locally weakened at a relatively shallow depth into the adjacent expanded region, and tearing the skin from the flock and from the expanded plastic at said locally weakened regions.

23. The method of claim 22, in which said second coat is also expandable but to a lesser degree than said flock-admixed coat.

24. The product of the method of claim 22.

25. The plastic-coated sheet article which comprises a reinforcing fabric base, and an expanded plastic adhered to one side of said base, the outer exposed side of said expanded plastic being characterized by a randomly distributed plurality of cellular pockets, and a randomly distributed plurality of flock elements rooted at one end in the expanded plastic and projecting at the other end clear of and above the general plane of the outer exposed side of said expanded plastic.

* * * * *